April 16, 1940.  G. A. LYON  2,197,502
VEHICLE RADIATOR BAFFLE CONSTRUCTION
Filed Jan. 16, 1937  6 Sheets-Sheet 1

Inventor
GEORGE ALBERT LYON.

April 16, 1940. G. A. LYON 2,197,502
VEHICLE RADIATOR BAFFLE CONSTRUCTION
Filed Jan. 16, 1937 6 Sheets-Sheet 2

Inventor
GEORGE ALBERT LYON.

April 16, 1940.   G. A. LYON   2,197,502

VEHICLE RADIATOR BAFFLE CONSTRUCTION

Filed Jan. 16, 1937   6 Sheets-Sheet 3

Inventor
GEORGE ALBERT LYON.

April 16, 1940.    G. A. LYON    2,197,502
VEHICLE RADIATOR BAFFLE CONSTRUCTION
Filed Jan. 16, 1937    6 Sheets-Sheet 5

Patented Apr. 16, 1940

2,197,502

UNITED STATES PATENT OFFICE 2,197,502

VEHICLE RADIATOR BAFFLE CONSTRUCTION

George Albert Lyon, Allenhurst, N. J.

Application January 16, 1937, Serial No. 120,887

9 Claims. (Cl. 180—69)

This invention relates to apparatus for controlling the flow of cooling fluid to radiators, and more particularly to a vehicle radiator baffle construction.

Many arrangements have been proposed in the past for regulating or controlling the flow of cooling fluid to radiators. Where the radiator is the cooling radiator of a motor vehicle, it is of course highly desirable to provide some type of baffle arrangement which may be adjusted to meet the widely varying requirements of cooling a radiator during different periods of the year. With the advent of ornamental radiator grilles on automobiles, it has also become highly desirable to provide some arrangement to prevent cross circulation of air through the radiator grille in order that the inrushing air may be used with the utmost efficiency under the circumstances. The most desirable arrangement for accomplishing the purposes referred to above would be some equipment which is inexpensive to construct, which is sturdy and reliable in use, which is entirely free from vibration when applied to a vehicle which is in motion, and which efficiently effects the desired control of the flow of air to the vehicle radiator.

It is an object of this invention to provide novel equipment possessing these highly desirable characteristics.

Another object of this invention is to provide a novel apparatus for controlling the flow of air to radiators which is economical to manufacture, which is rugged and reliable in use, and which may readily be mounted in the front of an automobile radiator or the like.

It is a further object of this invention to provide a novel radiator accessory including a baffle plate for disposition in substantially a longitudinal plane between the vehicle radiator and an ornamental radiator grille.

It is a still further object of this invention to provide a novel combination of vehicle radiator, vehicle radiator grille, and air baffle plates.

Another object of this invention is to provide a novel means for effecting opening and closing of a pair of vertically disposed, rotatably mounted baffle plates.

Another and still further object of this invention is to provide a novel method of assembling and mounting a radiator baffle construction between a vehicle radiator and a vehicle radiator grille.

A still further object of this invention is to provide a novel method and means for detachably securing a vehicle radiator baffle construction in desired position on a vehicle.

The novel features which I believe to be characteristic of my invention are set forth with particularity in the appended claims. My invention itself, however, both as to its organization, manner of construction, and method of operation, together with further objects and advantages thereof, may best be understood by reference to the following description taken in connection with the accompanying drawings, in which:

Figure 1:
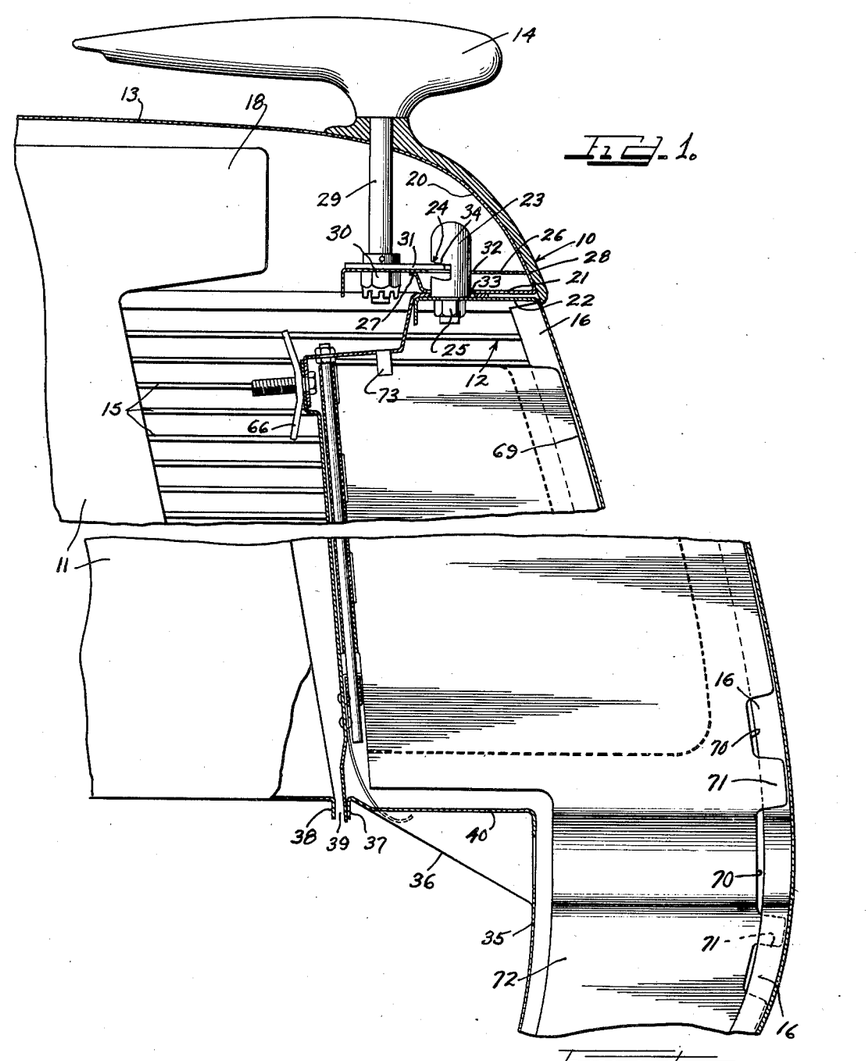
Figure 1 is a side elevational view partly in cross section showing one embodiment of my radiator baffle construction assembled between the cooling radiator of an automobile and the ornamental radiator grille of the same automobile.

In Figure 1 of the drawings, the front portion of an automobile 10 is illustrated and includes in general a cooling radiator 11, an ornamental radiator grille 12, an engine hood 13, and a hood ornament 14. The particular design of ornamental radiator grille 12 may, of course, vary through a wide range without departing from the spirit and scope of this invention, it being understood that this grille is merely for the purpose of ornamentation and is almost universally employed on automobiles today. As shown, radiator grille 12 includes a large number of horizontally disposed bars 15 which are secured together in desired space relationship at the front of the automobile by means of a flange 16 and at the rear by a flange (not shown). Bars 15 extend outwardly and rearwardly from front flange 16. Radiator grille 12 may be conveniently made up of two complementary halves which have their front flanges 16 secured together in any suitable manner, such as by welding or riveting (not shown).

Cooling radiator 11 may be of any construction such, for example, as the commonly employed honeycomb radiator, and includes a header 18 which extends a substantial distance into the space between radiator 11 and grille 12. Particular note should be taken that due to the fact that header 18 extends out a substantial distance into the space between radiator 11 and grille 12, only a relatively small opening is left between header 18 and the opening defining edge of grille 12 when hood 13 is raised. Although in order to prevent undue multiplicity of drawings, the entire automobile construction has not been illustrated, it is to be understood that hood 13 is of the type which is pivotally mounted at the rear and adapted to have its front portion raised. A suitable clamping or locking mechanism must, of course, be provided to secure hood 13 in its closed position. As shown in Figure 1, the front nose 20 of hood 13 is underturned as at 21 to form a flange for engaging the upper part 22 of grille 12. Secured centrally to the top of upper part 22 of grille 12 is a locking stud 23 which has a slot 24 therein adapted to receive the locking arm or cam of hood 13. Locking stud 23 may be secured to grille 12 in any suitable manner such, for example, as by means of a bolt 25, the lower portion of stud 23 being appropriately threaded therefor.

The nose 20 of hood 13 is reinforced by a flange or shelf 26 which extends across the inner portion of the nose in spaced relationship to flange 21. Flange or shelf 26 may be secured to hood 13 in any suitable manner such as by welding it at points 27 and 28. The locking mechanism of hood 13 is mounted on shelf 26 to a stud shaft 29 which is rigidly secured to ornament 14 and which rotatably extends through hood 13 and shelf 26. Ornament 14 and stud shaft 29 are held in desired position by means of a lock nut 30 which is threaded on the lower end of shaft 29. Rigidly secured to shaft 29, such as by means of a key (not shown), is an eccentrically mounted disc 31 which is adapted to extend into locking engagement with slot 24 of locking stud 23, as shown in Figure 1 of the drawings. Shelf 26 and underturned flange 21 of hood 13 are apertured at 32 and 33 respectively to receive stud 23.

From the above description, it will be readily understood that by grasping ornament 14 and rotating it through an angle of substantially 90° locking cam 31 will be rotated out of locking engagement with stud 23, and the hood 13 may then be raised. To lock hood 13 in its closed position, it is simply necessary to rotate ornament 14 to bring locking cam 31 back into engagement with slot 24 in stud 23. By providing slot 24 with a cross sectional configuration such as that shown in Figure 1 of the drawings, it will be readily understood that locking cam 31 first engages the higher outer portion of slot 24, and then as cam 31 is moved further into slot 24, the surface of cam 31 rides down the slanting curved surface 34, thus bring hood 13 into very tight engagement with the top of ornamental grille 12.

Referring now to the lower portion of Figure 1 of the drawings, it will be seen that grille 12 is provided with an interior portion which extends first upwardly from the lowermost portion of the grille as at 35 and then rearwardly and upwardly as at 36. The rear edge of rearwardly extending flange 36 is turned downwardly as at 37 in close proximity to the base flange 38 of cooling radiator 11. Particular note should be taken that lip 37 of flange 36 does not engage portion 38 of radiator 11 but rather leaves a channel 39 therebetween. As may be seen best in Figure 7 of the drawings, the center portion of rearwardly extending flange 36 is bent gradually upwardly to form a hill-like ridge 40. Hill-like ridge 40 of flange 36 thus extends forwardly from radiator 11 and substantially centrally thereof.

Figure 2:
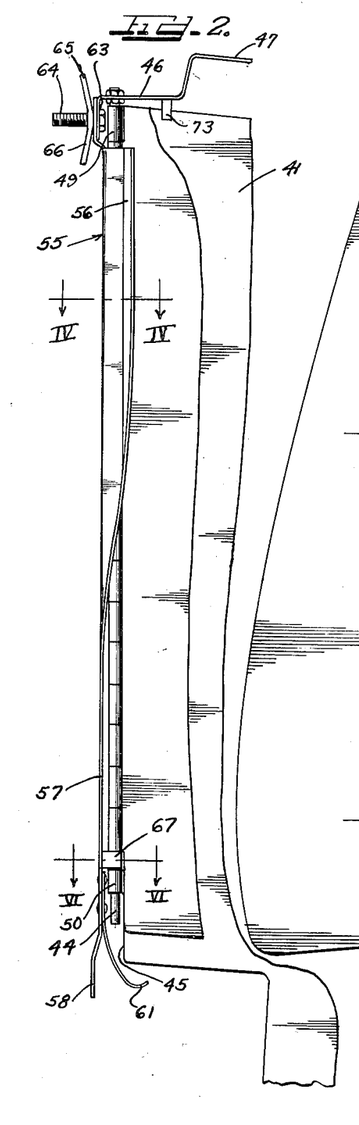
Figure 2 shows the baffle plate unit removed from its position as shown in Figure 1.
Figure 3:
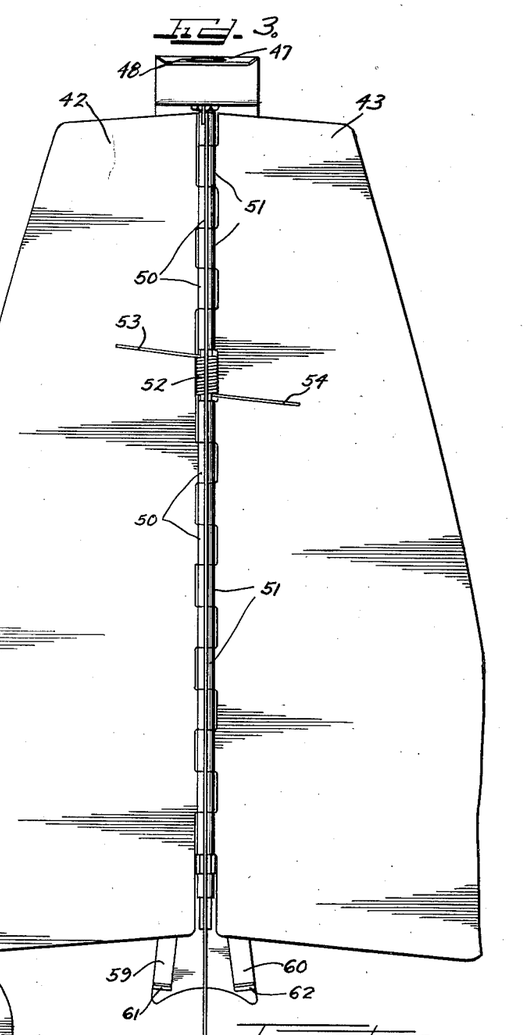
Figure 3 is a front elevational view of the baffle plate unit showing the movable baffle plates in closed position.

The air baffle unit or winter front structure, which is illustrated in Figures 1 to 8 of the drawings and which will now be described, is designed for permanent installation between the cooling radiator of a motor vehicle and the ornamental grille of the vehicle. The general nature of the baffle unit which is illustrated as a preferred embodiment of this invention may be seen best in Figures 2 and 3 of the drawings, while the manner in which it is mounted in the motor vehicle is shown in Figure 1 of the drawings. Referring now to Figures 2 and 3, the air baffle unit or winter front structure includes a central baffle plate 41 and a pair of movable baffle plates 42 and 43, one on either side of central baffle plate 41, which are arranged for relative angular movement with respect thereto. Baffle plates 42 and 43 are pivotally mounted on a pintle 44 which is disposed along the rear edge 45 of central baffle plate 41. Pintle 44 may be conveniently supported from a bracket 46 which is adapted to have its upper forwardly extending edge 47 engage locking stud 23 (see Figure 1), forwardly extending end 47 being suitably apertured as at 48 for this purpose. Pintle 44 is also arranged to extend through an upper collar 49 and a lower collar 50 on central baffle plate 41, collars 49 and 50 being preferably crimped or otherwise suitably permanently secured to pintle 44. Movable baffle plate 42 is provided with a series of bearing collars 50 through which pintle 44 extends, and movable baffle plate 43 is provided with a similar set of bearing collars 51 which are arranged to alternate with collars 50 on baffle plate 42.

One means which has been found highly satisfactory for determining the angular position of baffle plates 42 and 43 with respect to central baffle plate 41 is to provide the structure with a biasing spring 52 which constantly urges baffle plates 42 and 43 apart and then provides some means for limiting the movement caused by biasing spring 52. It will, of course, be understood that any suitable biasing means be employed, the spring 52 which is wound about pintle 44 and having opposite ends 53 and 54 extending into engagement with baffle plates 42 and 43 respectively being merely illustrative of one common form of biasing means.

Figures 5, 6, 7:
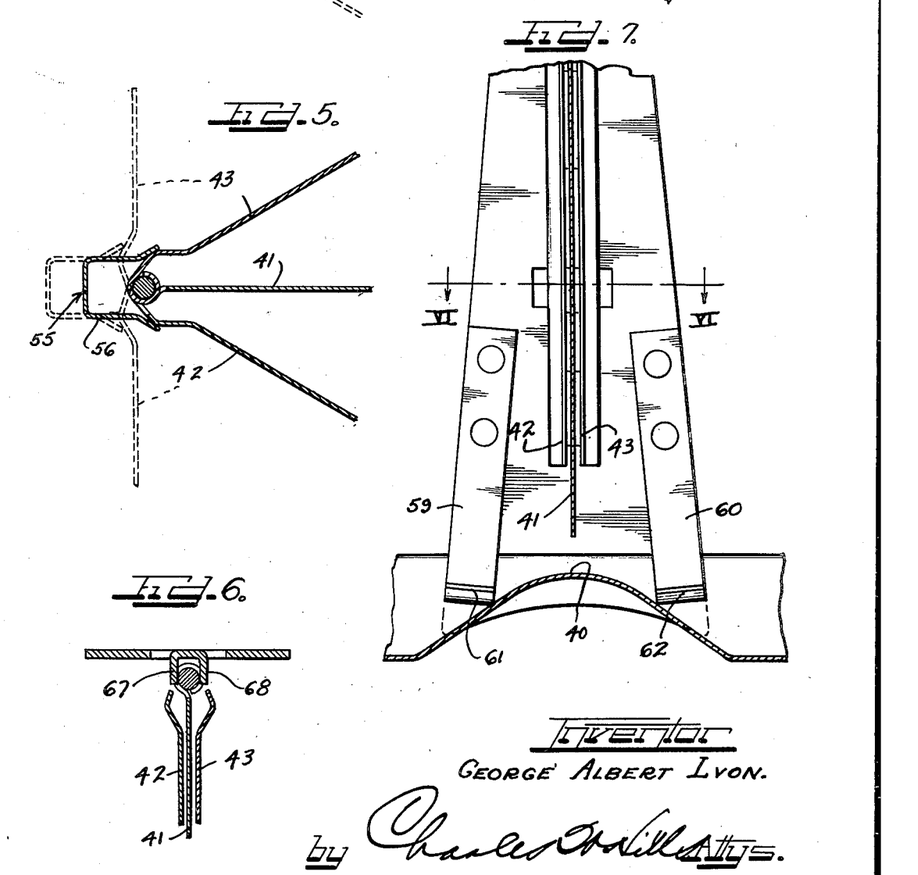
Figure 6 is a cross sectional plan view taken along the line VI—VI of Figure 2.
Figure 7 is an enlarged front view partly in cross section illustrating the lower portion of the baffle plate unit.

The adjustable abutting means which limits the angular displacement of baffle plates 42 and 43 includes a channel member 55 which is disposed rearwardly of pintle 44. Channel member 55 includes a trough-like or channel upper portion 56 and a relatively flat lower portion 57. The lower portion of channel member 55 terminates in a downwardly extending lip 58 which is adapted to be disposed in the channel 39 between lip 37 of blank 36 of grill 12 and lip 38 of radiator 11. Secured along the side edges of lip 48 are two spring fingers 59 and 60 (Figure 7). The lower ends of spring fingers 59 and 60 are curled upwardly as at 61 and 62. The spring fingers 59 and 60 are adapted to engage rearwardly extending flange 36 of grille 12 on opposite sides of ridge 40. It will thus be observed that the lower end of channel member 55 is arranged for limited rocking movement thereabout.

Bracket 46 from which pintle 44 is suspended is provided with a downwardly extending rear portion 63 upon which rearwardly extending bolt 64 is mounted. An upwardly extending lip 65 on channel member 55 is apertured and arranged for free movement over bolt 64. A wing nut 66 which is threaded for engagement with bolt 64 determines the rearward displacement of lip 65 of channel member 55. Since channel portion 56 of channel member 55 extends about the upper portion of pintle 44 into engagement with movable baffle plates 42 and 43, it will be apparent that the angular displacement of baffle plates 42 and 43 depends upon the position of channel portion 56, since biasing spring 52 is constantly urging baffle plates 42 and 43 against the outer edges of the channel portion 56 of channel member 55. The manner in which the movement of channel member 55 effects angular movement of baffle plates 42 and 43 will be best understood from an inspection of Figures 4 and 5 of the drawings. In the full line position in Figure 4, channel portion 56 of channel member 55 is shown in its forwardmost position, thereby causing baffle plates 42 and 43 to be disposed in close proximity and alongside of central baffle plate 41. In the dotted line position in Figure 4 and in the full line position in Figure 5, channel member 55 has moved rearwardly thereby permitting biasing spring 52 to act upon baffle plates 42 and 43 to divert them to the position shown. In the dotted line position in Figure 5, the channel member 55 has moved to its rearwardmost position thereby permitting baffle plates 42 and 43 to be moved to the position shown—that is to say, to a position substantially 90° from their full line position in Figure 4.

Figure 4:
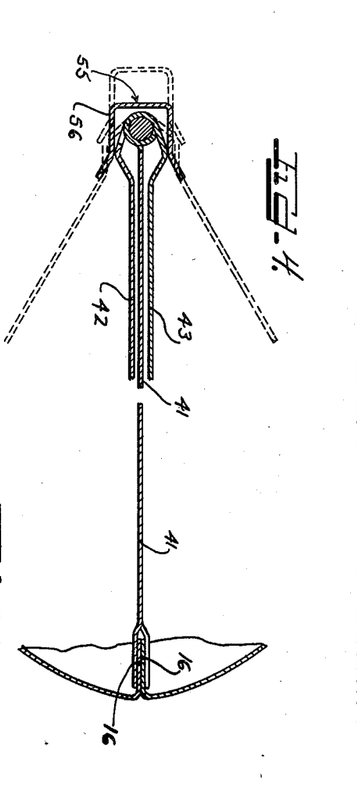
Figures 4 and 5 are cross sectional views looking down on the top of the baffle plate construction, Figure 4 illustrating the movable plates in their open position and taken along the line IV—IV of Figure 2, and Figure 5 illustrating the movable plates in a partially closed position.

As will hereinafter be used, the expression "open position" will be used to refer to the position of baffle plates 42 and 43 as shown in their full line position in Figure 4, that is with baffle plates 42 and 43 disposed in close proximity alongside of central baffle plate 41. The expression "closed position" will be used to designate the position of baffle plates 42 and 43 as they appear in their dotted line position in Figure 5, that is when baffle plates 42 and 43 are substantially 180° apart. The reason for this particular terminology is that when baffle plates 42 and 43 are in close proximity to central baffle plate 41, the maximum amount of inrushing air will pass to radiator 11, and when baffle plates 42 and 43 are spread wide apart, the minimum amount of inrushing air will pass to radiator 11.

In order to prevent lateral displacement of lower end of channel member 55 with respect to pintle 44, it has been found desirable under some circumstances to strike two tabs 67 and 68 from lower portion 57 of channel member 55 to extend about pintle 44, as is shown in Figure 6 of the drawings. Although a pair of tabs 67 and 68 are shown by way of illustration as one means for preventing lateral displacement of the lower end of channel member 55 with respect to pintle 44, it is obvious that many other means may be employed without departing from the spirit and scope of this invention, such for example as providing the lower end 57 of channel member 55 with a collar through which pintle 44 extends.

Referring back to Figure 1, the manner in which the baffle plate unit is mounted between radiator 11 and radiator grille 12 will be described. The forward edge 69 of central baffle plate 41 is spot welded or otherwise suitably secured to the forward flanges 16 of radiator grille 12. A portion of the forward edge 69 is preferably serrated as at 70 to provide a plurality of tabs 71 which are disposed alternately on opposite sides of inturned flanges 16. This further aids in providing a very rigid and rugged mounting for the baffle plate units. As will readily be observed from the different figures of the drawings, particularly Figure 1, baffle plate 41 is provided with a downwardly extending tail portion 72 which extends between the upturned portion 35 of grille 12 and the underturned forward edge of grille 12. Although for purposes of simplicity of illustration and in order to prevent an undue multiplication of figures, the precise point at which portion 72 terminates is not shown in Figure 1, it is to be understood that the portion 72 terminates at substantially the base of grille 12. Furthermore, it is to be understood that the configuration of central baffle plate 41 may vary considerably without departing from the spirit and scope of the present invention, but preferably the tail portion 72 of the preferred embodiment of the invention illustrated in Figures 1 to 8 of the drawings is similar to that shown in the single baffle plate embodiment of the invention illustrated in Figure 11 of the drawings. As was previously pointed out in connection with the description of the exact character of the baffle plate unit, downwardly extending lip 58 of channel member 55 is disposed in channel 39, while resilient fingers 59 and 60 straddle hill-like ring portion 40 of grille 12 to engage the sloping surface 36 thereof. As was further pointed out, the bracket arm 46 extends over locking stud 23. Thus, when hood 13 is lowered and locked into position, flange 21 of hood 13 presses firmly against end portion 47 of bracket 46, thereby firmly securing the upper rear part of the baffle plate unit in desired position. In order to reduce any possibility of vibration, a tab 73 may be struck down from bracket 46 and spot welded or otherwise suitably secured to the upper rear edge of central baffle plate 41.

From the above description it will now be readily apparent that in order to effect control of the flow of air to radiator 11, it is simply necessary to adjust wing nut 66 until movable baffle plates 42 and 43 are disposed in desired position. When the vehicle is being operated in the summer time or under conditions where it is desirable to permit the maximum amount of air to flow through radiator 11, wing nut 66 is screwed up tight so as to advance channel member 55 to its forwardmost position. Movement of channel member 55 to its forwardmost position causes movable baffle plates 42 and 43 to be angularly moved to their "open position," or that is to say, to their position in close proximity to central baffle plate 41. During the spring and fall seasons of the year or at such times when it is desirable to slightly reduce the flow of air to radiator 11, spring nut 66 is unscrewed slightly thereby permitting movable baffle plates 42 and 43 to divert to a partly open position. During the winter season of the year or at such times when it is desired to reduce the flow of air to radiator 11 to the minimum, wing nut 66 is unscrewed until movable baffle plates 42 and 43 have diverged to the position indicated in the dotted lines of Figure 5. Although baffle plates 42 and 43 in their "closed position" extend in substantial parallelism with the front face of radiator 11, it is to be understood that due to the particular shape of the baffle plates some air is always permitted to flow through radiator 11. This is a desirable and necessary feature for radiator constructions of the type which are commonly employed on motive vehicles today.

It is to be noted that since central baffle plate 41 is stationary with respect to the vehicle construction, it always extends across the space between the front face of radiator 11 and the front of radiator grille 12 irrespective of the position of movable baffle plates 42 and 43. This has been found to be a highly desirable feature for the reason that it prevents cross circulation of air through grille 12 when movable baffle plates 42 and 43 are in a position other than their "open position," and also for the reason that it greatly enhances the general appearance of the front of the motive vehicle, since it prevents a clear view through the radiator grille 12 from one side to the other. In connection with the latter feature of the central baffle plate 41, it is to be noted that the general beauty and appearance of the motive vehicle may be still further enhanced by painting or enameling central baffle plate 41 and movable baffle plates 42 and 43 in the same color as that in which the motor vehicle has been painted or in some contrasting color which harmonizes therewith. If desired, central baffle plate 41 and movable baffle plates 42 and 43 may be given a high polished finish such as that produced by chromium plating or the like.

Figure 8:
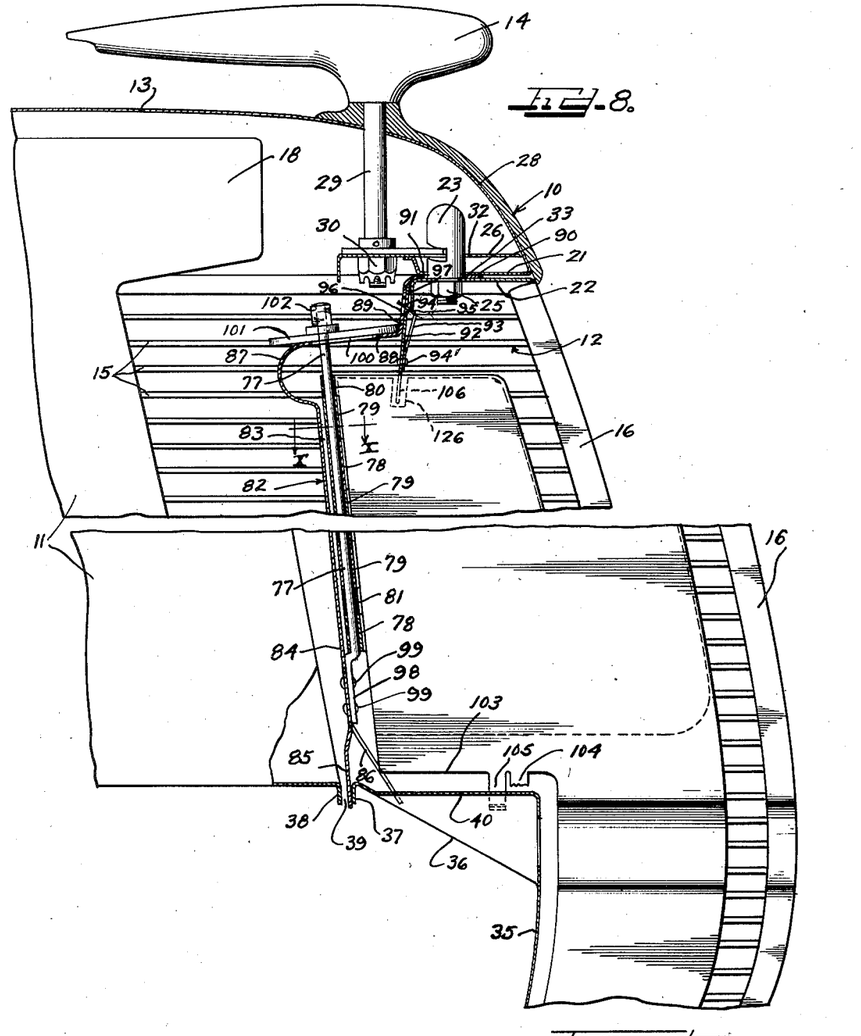
Figure 8 is a side elevational view partly in cross section showing a different embodiment of my invention assembled between the cooling radiator of an automobile and the ornamental grille.
Figures 9, 11, 12:
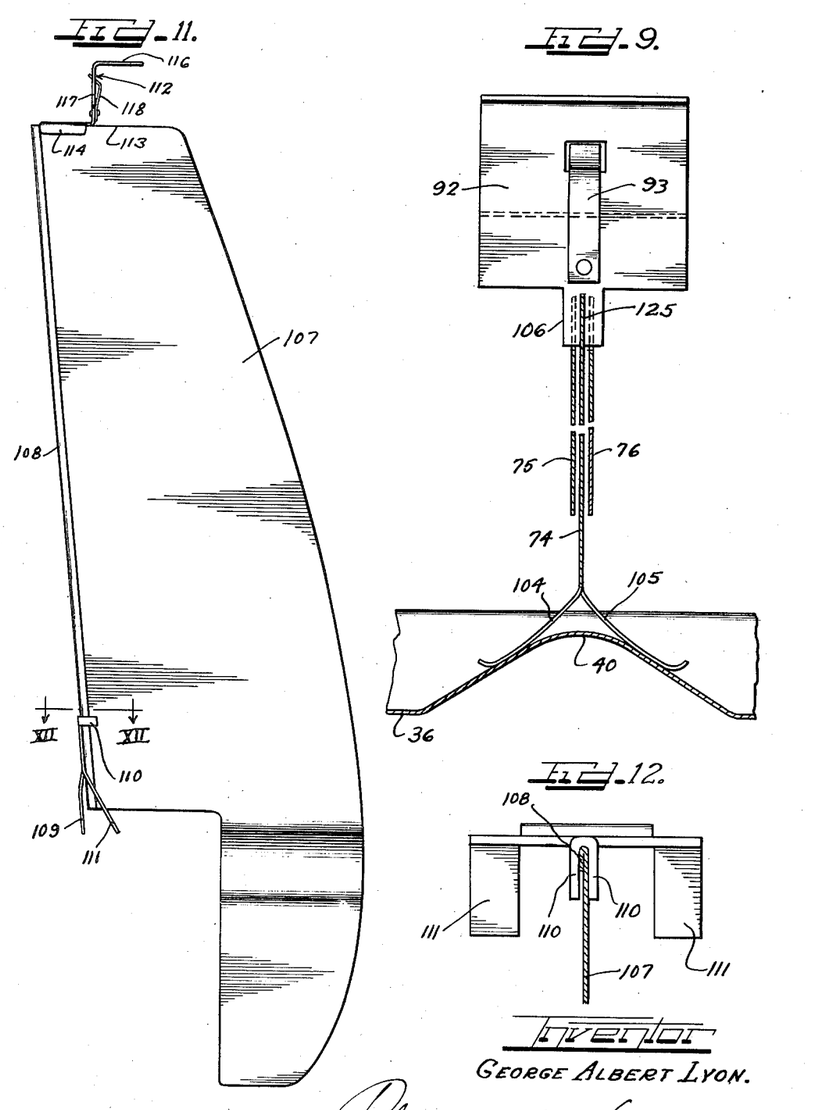
Figure 9 is a fragmentary front elevational view partly in cross section of the baffle plate unit illustrated in Figure 8.
Figure 11 is a side elevational view of a different embodiment of the baffle plate unit construction wherein only a single baffle plate is employed.
Figure 12 is a fragmentary cross sectional view of the single baffle plate unit construction taken along the line XII—XII of Figure 11.
Figures 10, 13, 14:
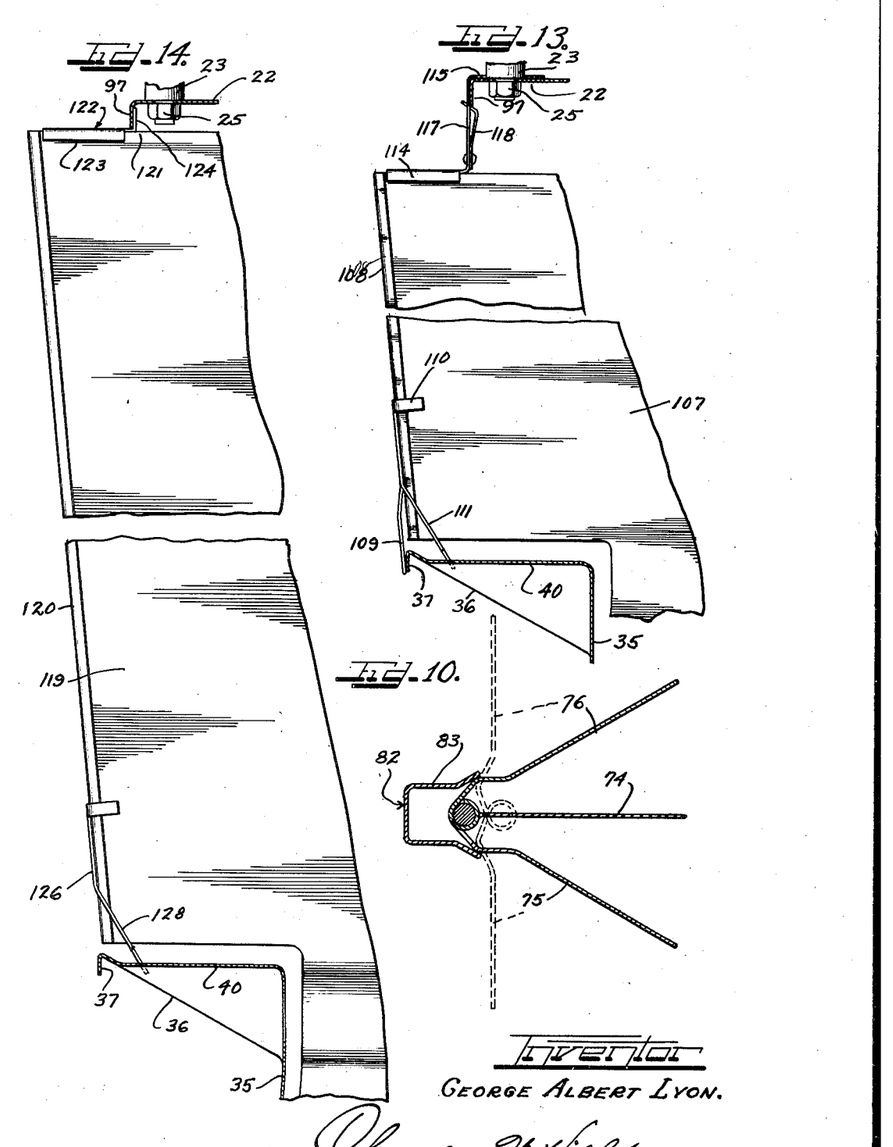
Figure 10 is a cross sectional view of the modified baffle plate unit taken along the line X—X of Figure 8.
Figure 13 is an enlarged fragmentary view illustrating in greater detail the manner by which the single baffle plate unit is adapted to be connected to the radiator grille.
Figure 14 is a side elevational view of a single baffle plate unit construction similar to that shown in Figure 11 with the exception that it is arranged for permanent mounting on the radiator grille.

In Figures 8, 9, and 10 of the drawings, I have illustrated an embodiment of my invention wherein an air baffle unit of the general type described in connection with Figures 1 to 7 of the drawings is shown, but in this case the air baffle unit is adapted to be detachably mounted between the radiator and the radiator grille of a motor vehicle, thereby permitting ready removal thereof when desired. In order to simplify the description of those parts in this modification of the invention which are precisely similar to those described in connection with the preferred embodiment of the invention, they have been given the same reference characters. The air baffle unit structure includes a central baffle plate 74 which extends forwardly into close proximity with the front edge of radiator grille 12 but preferably does not engage or otherwise contact the radiator grille. Disposed on opposite sides of central baffle plate 74 are two movable baffle plates 75 and 76 which are rotatably mounted on a pintle 77 by means of alternately disposed bearing collars 78 and 79 affixed to the rear edge of baffle plates 75 and 76 respectively. Pintle 77 also extends through two collars 80 and 81 which are formed along the rear edge of central baffle plate 74. Preferably collars 80 and 81 are crimped on pintle 77 or otherwise permanently secured thereto, thereby preventing any rotational movement of collars 80 and 81 about pintle 77.

Although not specifically illustrated in Figures 8, 9, and 10, it is to be understood that a biasing spring similar to that illustrated in Figure 3 is provided for urging movable baffle plates 75 and 76 away from central baffle plate 74. A channel member 82 is provided for cooperation with movable baffle plates 75 and 76 whose main portion is similar to that shown in Figure 2 and includes an upper channel portion 83 and a lower flat portion 84.

The lower extremity of channel member 82 is provided with a downwardly extending lip 85 which is adapted to extend into the channel 39 formed by flange 37 of radiator grille 12 and flange 38 on radiator 11. Relatively rigid fingers 86 are secured to the lower portion 84 of channel member 82 and are arranged to extend downwardly on either side of hill-like ridge portion 40 into engagement with the rearwardly extending flange 36 of radiator grille 12. For a reason which will presently appear, it is important to provide relatively rigid fingers rather than resilient fingers in this embodiment of the invention.

The upper extremity of channel member 82 is bowed out as at 87 and then forwardly in an intermediate slotted portion 88, then upwardly as at 89, and finally forwardly again as at 90. End portion 90 is provided with an aperture 91 which is adapted to extend over locking stud 23. Welded or otherwise suitable secured to upwardly extending portion 89 is a downwardly extending flange 92. In proximity to the lower end of flange 92, an L-shaped resilient finger 93 is secured by means of a rivet 94' and is disposed in the manner indicated in Figure 8 of the drawings. L-shaped resilient finger 93 extends upwardly and slightly forwardly and then rearwardly and upwardly in a tip portion 94 which extends through cooperating apertures 95 and 96 in flange 92 and portion 89 respectively. From a careful inspection of Figure 8 of the drawings, it will readily be understood that resilient finger 93 provides a simple means by which the baffle plate unit may be readily arranged to make a detachable snap-on engagement with the radiator grille of the motor vehicle. Thus, in assembling the air baffle unit, the end portion 90 of the upper bracket is slipped over locking stud 23 and the unit lowered until relatively rigid fingers 86 engage rearwardly extending flange portion 36 of radiator grille 12. As the baffle plate unit is being lowered, resilient finger 93 is depressed by reason of its engagement with the downwardly turned flange portion 97 of rearwardly extending portion 22 of radiator grille 12. As the air baffle plate unit nears its lowermost position, that is to say, when rigid fingers 86 near the point at which they engage the rearwardly extending flange 36, resilient finger 93 snaps under the lowermost edge of lip portion 97 of rearwardly extending flange 22, thereby causing the tip portion 95 of spring finger 93 to engage the lowermost edge of lip 97. Any tendency now for the air baffle unit to pull upwardly is impeded by the action of spring finger 93. As will readily be understood by those skilled in the art, the use of a spring finger of this character makes it relatively easy to assemble the air baffle unit in desired position, since only a relatively small force is necessary to depress spring finger 93 when the unit is moving in a downward direction, but a relatively great force is necessary to remove the unit, since to cause depressing of spring finger 93 by upward movement of the air baffle unit requires the application of a relatively great force.

From the above description, it is apparent that the channel member 82 is not movable relative to the radiator grille 12 as it was in the preferred embodiment of the invention. In order to effect the desired opening and closing of the movable baffle plates 75 and 76, it is therefore necessary in this embodiment of the invention to provide suitable mechanism for causing movement of the pintle 77 relative to the channel portion 83 of channel member 82. The mechanism by which this is accomplished will now be described. The lower end of pintle 77 is flattened out as at 98 and secured to the flat portion 84 of channel member 82 by means of rivet 99. The upper end of pintle 77 extends through a slot 100 in portion 88 of the upper bracket. Slot 100 extends longitudinally of the bracket and is of sufficient extent to permit the maximum range of movement of pintle 77 which is necessary to permit opening and closing of movable baffle plates 75 and 76. Rigidly secured to pintle 77 on the upper side of portion 88 is an eccentrically mounted cam member 101, the cam member being provided with a suitable boss 102 for receiving a wrench or suitable tool by means of which the cam may be rotated. Cam 101 engages the upwardly extending portion 89 of the upper bracket and thereby limits the forward movement of pintle 77 depending, of course, upon the angular position of cam 101. Inasmuch as the biasing spring associated with movable baffle plates 75 and 76 is constantly urging the baffle plates apart and since this movement in turn tends to urge pintle 77 out of channel portion 83 of channel member 82, it is obvious that the upper end of pintle 77 is biased in a forward direction, the forward movement of pintle 77 being limited by the engagement of cam 101 with upwardly extending portion 89 of the upper bracket.

In order to provide sufficient rigidity to the central baffle plate 74, the lower rear edge 103 of central baffle plate 74 is provided with two downwardly extending resilient fingers 104 and 105 which extend into engagement with the hill-like ridge 40 of radiator grille 12 on opposite sides thereof. Lateral movement of the lower end of central baffle plate 74 is thereby prevented.

Lateral displacement of the upper portion of central baffle plate 74 may be conveniently prevented by providing a downwardly extending flange 92 with a central tab 106 which is centrally slotted as at 125 for disposition over central baffle plate 74. Tab 106 thus acts as a yoke to prevent lateral displacement of the upper portion of central baffle plate 74. Since movable baffle plates 75 and 76 are arranged to be moved into close proximity with central baffle plate 74, plates 75 and 76 are preferably cut out as at 126 to prevent interference with tab 106.

From the above description, it will be apparent that I have provided an extraordinarily simple arrangement by which a multi-plate baffle unit construction may be detachably mounted between a vehicle radiator and a vehicle radiator grille.

In Figures 11, 12, and 13 of the drawings I have illustrated an embodiment of my invention wherein only the central baffle plate is employed, and wherein provision is made for removing the central baffle plate at will. Although the single central baffle plate has not been illustrated in position between the vehicle radiator and the vehicle radiator grille, it is to be understood that it is disposed in precisely the same manner in which the central baffle plate of the multi-baffle plate unit of Figure 8 is disposed. As shown in Figure 11, the single central baffle plate 107 is provided with a rear edge 108 which is bent back on itself to increase the rigidity of the plate. To the lower end of rear edge 108 a downwardly extending lip 109 is secured by means of a pair of tabs 110 which are welded or otherwise suitably secured to opposite sides of baffle plate 107. Two relatively rigid fingers 111 are also provided for engagement with the rearwardly extending flange 36 of ornamental grille 12 on opposite sides of hill-like ridge 40 thereof.

An upwardly and forwardly extending bracket 112 is secured to the upper edge 113 of baffle plate 107 by means of a pair of downwardly extending lip portions 114 which are welded or otherwise suitably secured to opposite sides of baffle plate 107. The upper edge portion 115 is apertured as at 116 in order to permit bracket 112 to be slipped over locking stud 23 of the motor vehicle. To the upwardly extending intermediate portion 117 of bracket 112 is secured an L-shaped resilient finger 118 which operates in precisely the same manner as spring finger 93 of the embodiment of this invention illustrated in Figure 8. As baffle plate 107 is moved downwardly into position, spring finger 118 is depressed by reason of its engagement with downwardly extending lip 97 on flange 22 of grille 12. As baffle plate 107 reaches its desired position determined by relatively rigid fingers 111, resilient finger 118 snaps forwardly into locking engagement with the lowermost edge of lip 97.

While the single baffle plate form of this invention does not provide any means by which the amount of air which flows to radiator 11 can be controlled, it does prevent cross circulation of air through radiator grille 12, and it also greatly enhances the general appearance of the motor vehicle by reason of the fact that the normally unobstructed view from one side of the vehicle to the other through the cross bars of the radiator grille is prevented. Baffle plate 107 is preferably painted some color which will harmonize with the color of the car or is chromium plated.

A slightly different view of the embodiment of the invention illustrated in Figure 11 of the drawings is shown in Figure 14. In this particular form, a single baffle plate 119 is employed which is adapted to be permanently secured to the radiator grille 12 in the manner in which the central baffle plate 41 of the preferred embodiment of the invention is secured. That is to say, the forward edge (not shown in Figure 14) is welded or otherwise suitably secured to the forward flange 16 of radiator grille 12 in the manner described in connection with Figure 1 of the drawings. The rear edge 120 of baffle plate 119 is preferably bent back on itself to increase the rigidity of the baffle plate and to reduce the possibility of vibration when the baffle plate is mounted in a motor vehicle. Since the rear edge 120 of baffle plate 119 cannot be rigidly secured to any portion of the motor vehicle in the manner in which the front edge is spot welded to the front flange 16 of radiator grille 12, some means is preferably provided to prevent lateral vibration of the rear of the baffle plate 119. One means which has been found satisfactory is to provide the upper edge 121 of baffle plate 119 with a bracket 122 which is secured to baffle plate 119 by means of a pair of downwardly extending lips 123 which are spot welded or otherwise suitably secured to opposite sides of baffle plate 119. The upturned end 124 of bracket 122 is adapted to be spot welded to the front face of downwardly extending lip 97 of flange 22.

The lower rear end of baffle plate 119 is provided with a downwardly extending bracket 126 which is similar to the bracket provided in the modification illustrated in Figure 11 of the drawings. Bracket 126 includes a downwardly extending lip 127 and a pair of relatively rigid fingers 128 which extend on either side of hill-like ridge 40 of radiator grille 12 into contact with the rearwardly extending flange 36. Fingers 128 may be welded or otherwise suitably secured to flange 36 if desired, although it is usually not necessary since the engagement of rigid fingers 128 on opposite sides of hill-like ridge 40 is sufficient to prevent any lateral displacement of baffle plate 119.

Inasmuch as baffle plate 119 is arranged for permanent installation in the motor vehicle and since it is not necessary to provide some form of detachable snap-on means such as that illustrated in connection with the embodiment shown in Figure 11, the baffle plate 119 may extend up further between radiator 11 and radiator grille into closer proximity with flange 22. It will, of course, be understood that the precise configuration of the central baffle plate and the height at which it is arranged for disposition may vary through wide limits without departing from the spirit and scope of the present invention.

While I have shown particular embodiments of my invention, it will of course be understood that I do not wish to be limited thereto, since many modifications may be made, and therefore contemplate by the appended claims to cover all such modifications as fall within the true spirit and scope of my invention.

I claim as my invention:

1. As an article of manufacture, a removable air baffle unit for disposition within a V-shaped ornamental vehicle radiator grille, including a plurality of vertically disposed baffle plates including a central baffle plate adapted to extend forwardly between the sides of said grille, the remainder of said baffle plates being adapted to be angularly moved with respect to said central baffle plate.

2. In a vehicle cooling radiator and a V-shaped ornamental radiator grille assembly in which said grille is mounted in spaced relationship to said radiator, the combination therewith of a vertically disposed baffle plate rigidly secured along its forward edge to said grille within said V and extending rearwardly therefrom, a pair of baffle plates mounted on either side of said first baffle plate for angular movement about a common axis disposed in spaced relationship to said grille.

3. In a vehicle cooling radiator and a V-shaped ornamental radiator grille assembly in which said grille is mounted in spaced relationship to said radiator, the combination therewith of a vertically disposed baffle plate rigidly secured along its forward edge to said grille within said V and extending rearwardly therefrom, a pair of baffle plates mounted on either side of said first baffle plate for angular movement about the rear edge of said first baffle plate, means for biasing said pair of plates away from said first plate, and means including a movable channel member engaging said pair of plates in proximity to the axis of movement thereof, thereby to adjustably determine the angular position of said pair of plates with respect to said first plate.

4. An air baffle unit comprising a stationary baffle plate, a pintle mounted along one edge of said baffle plate, a pair of baffle plates disposed on either side of said first baffle plate rotatably mounted on said pintle, a channel member extending along a portion of said pintle arranged for movement to and away from said pintle, biasing means for diverging said pair of baffle plates thereby causing said plates to abut opposite edges of said channel portion, and means for adjusting the spacing between said pintle and the bottom of said channel portion.

5. An air baffle unit comprising a stationary baffle plate, a pintle mounted along one edge of said baffle plate, a pair of baffle plates disposed on either side of said first baffle plate rotatably mounted on said pintle, a channel member extending along a portion of said pintle arranged for movement to and away from said pintle, biasing means for diverging said pair of baffle plates thereby causing said plates to abut opposite edges of said channel portion, and means for moving said channel member thereby to effect adjustable movement of said pair of baffle plates with respect to said first baffle plate.

6. In combination with a radiator grille having side portions with openings therein permitting vision across clear through the grille, of three substantially vertically disposed baffle plates mounted in the space between said side portions, said baffle plates being angularly arranged with respect to each other, the center plate extending in the plane of symmetry of said grille and said other plates being adjustably movable with respect to said center plate.

7. In combination with a radiator core, a radiator grille ahead of and spaced from the core and an engine compartment lid extending over said core to said grille, a partition between the core and the grille and perpendicular to the core, and means associated with the partition for blanketing said core, said partition and said means being adjustable so that in one position their greatest horizontal dimension is less than the greatest horizontal dimension of an opening under said lid between the top of the core and the top of the grille and so that in another position their greatest horizontal dimension in a direction across the core is greater than said dimension of said opening so that said partition and associated means may be inserted through said opening and then be adjusted to blanket a portion of said core wider than said opening.

8. In combination with a radiator core and a radiator grille projecting ahead of the core and having air intake openings in its sides of such a shape as to allow spectators to see across through the grille, an assembly comprising adjustable means for affecting the flow of air through the grille to the core and means operative irrespective of the adjustment of the first means for blocking vision across through the grille.

9. In combination with a radiator grille whose central portion projects ahead of its side portions, an assembly insertable as a unit and comprising a partition for blocking sight across the grille and an adjustable baffle for blocking air flow through the grille.

GEORGE ALBERT LYON.